United States Patent
Cohen et al.

(10) Patent No.: US 6,783,830 B2
(45) Date of Patent: Aug. 31, 2004

(54) ADHESIVE TAPE STRUCTURE FOR USE WITH INSULATION JACKETS

(75) Inventors: Lewis S. Cohen, Needham, MA (US); Gary Litman, Framingham, MA (US)

(73) Assignee: Venture Tape Corp, Rockland, MA (US)

( * ) Notice: Subject to any disclaimer, the term of this patent is extended or adjusted under 35 U.S.C. 154(b) by 0 days.

(21) Appl. No.: 10/349,802

(22) Filed: Jan. 23, 2003

(65) Prior Publication Data

US 2004/0146680 A1 Jul. 29, 2004

(51) Int. Cl.[7] .................................................. B32B 7/12
(52) U.S. Cl. ...................... 428/40.1; 138/149; 138/151; 138/152; 428/36.9; 428/36.91; 428/42.2; 428/192; 428/194
(58) Field of Search ............................... 428/40.1, 36.9, 428/36.91, 192, 194, 42.2; 138/149, 151, 152

(56) References Cited

U.S. PATENT DOCUMENTS

| | | | |
|---|---|---|---|
| 4,022,248 A | * | 5/1977 | Hepner ........................ 138/151 |
| 4,157,410 A | | 6/1979 | McClintock |
| 4,595,615 A | | 6/1986 | Cohen |
| 4,606,957 A | | 8/1986 | Cohen |
| 4,780,347 A | | 10/1988 | Cohen |
| 4,842,908 A | | 6/1989 | Cohen et al. |
| 4,946,732 A | | 8/1990 | Cohen et al. |
| 5,104,701 A | | 4/1992 | Cohen et al. |
| 5,964,252 A | | 10/1999 | Simmons et al. |

* cited by examiner

Primary Examiner—Nasser Ahmad
(74) Attorney, Agent, or Firm—Wolf, Greenfield & Sacks, P.C.

(57) ABSTRACT

A tape structure and/or closure system particularly useful with cylindrical insulation segments for pipes. The tape structure provides both a temporary and a permanent closure. The tape structure includes a substrate and a layer of pressure sensitive adhesive disposed on both sides of the substrate. One of the layers of pressure sensitive adhesive is covered by a release liner, while the other layer of pressure sensitive adhesive is exposed. The exposed layer of pressure sensitive adhesive is applied to one of either the underside of a flap covering a slit in the insulation jacket, or to the outer surface of the insulation jacket. The release liner is divided into two portions, one of which is narrow with respect to the other portion. The narrow portion of the release liner is removed, and a narrow strip of the second layer of pressure sensitive adhesive is attached to the other of either the outer surface of the jacket, or the underside of the flap to form a temporary closure. When it is desired to insert a pipe into the insulation segment, the temporary closure is broken by pulling the flap away from the insulation jacket. The pipe is then inserted, and a permanent closure is effected by removing the other portion of the release liner and attaching the second layer of pressure sensitive adhesive to the other of either the underside of the flap or the outer surface of the insulation jacket.

14 Claims, 1 Drawing Sheet

ADHESIVE TAPE STRUCTURE FOR USE WITH INSULATION JACKETS

FIELD OF THE INVENTION

This invention relates generally to adhesive tape structures, and more particularly to adhesive tape structures which are used in conjunction with insulation for fluid conduits.

BACKGROUND OF THE INVENTION

Most heating and air conditioning units in dwellings, commercial buildings and industrial plants include cylindrical pipes which carry heated or cooled air or water or steam. In addition, in industrial applications, pipes may be used to carry these and other fluids. In most instances, particularly in more severe climates, these pipes must be insulated to prevent freezing, and/or to maintain the temperature of the fluid within the pipes, especially where the pipes are disposed on the exterior of the building structure.

Insulation segments may be used to insulate such pipes. These segments typically are cylindrical in shape and include an inner insulating layer surrounded by a jacket. In the center of the segments is a cylindrical passageway extending axially or longitudinally along the segment and having a diameter roughly equal to the outside diameter of the pipe to be insulated. A longitudinal slit is provided extending from one end of the segment to the other. This slit may be opened to allow insertion of the pipe therethrough and into the central passageway. A flap is provided for covering the slit and for sealing the pipe within the segment. Such segments typically extend along a pipe in an end to end, abutting relationship to fully insulate and seal the pipe.

The inner insulating layer in each segment typically is formed of a fiberglass or mineral wool, a foamed cellular fiberglass or a rigid foam. The jacket which covers the insulating layer typically is formed of a metal or metalized foil, and/or a layer of kraft paper or the like. A preferred jacket material is an All Service Jacket (ASJ), which has layers that include paper, scrim, and aluminum foil and/or metalized polyester. Often, the metal or metalized layers and/or paper layers are laminated together to provide a weather-tight structure with a suitable tear and tensile strength. Typically the flap which covers the slit is merely an extension of the jacket and is formed of the same materials.

Often, the flap and/or the outer surface of the insulation jacket adjacent the slit is provided with a strip of adhesive or adhesive tape to bond the flap to the outer surface of the jacket to cover and seal the slit. The actual sealing of the flap to the jacket typically occurs at the job site when the insulation is installed. It is desirable, if not necessary, to keep the bonding surfaces of the flap and the confronting, outer surface of the jacket free from dirt and moisture to permit a tight seal. If the seal is not satisfactory, "fish mouthing" can occur either as a result of the breakdown of the bond between the adhesive strip and the flap, or the bond between the adhesive strip and the outer surface of the jacket. This breakdown can produce delamination or disintegration of the jacket or the flap which can occur over a period of a few weeks in a very damp environment, or over a period of many months in less damp environments. If such "fish mouthing" occurs, the insulation segments must be removed and replaced if the desired level of protection is to be maintained "Fish mouthing" is a particular problem on jobs for the United States Government, since such "fish mouthing" does not meet its specifications and the contractor may be required to return to the job site and repair the damage at his or her own cost.

Moreover, hot melt adhesives typically are used to bond the jacket to the inner insulating layer. The insulation segments typically are still hot, and the adhesive is still soft and not yet cured, when the insulation segments are placed in containers for shipment. This quick placement in containers is necessary to expedite the manufacturing and shipping process. The containers into which the segments are placed tend to act as insulators and retain the heat within the container maintaining the hot melt adhesive in a softened condition for a prolonged period of time after placement in the containers. As a result, the jacket can separate from the inner insulating layer prior to cooling and curing, and prior to arrival of the segment at the job site. Such separated segments are not acceptable, and must either be discarded or reattached. Obviously, this repair or replacement is very costly. To overcome this problem, harder, more quickly curing adhesives have been used to bond the jacket to the inner insulating layer. However, since these harder adhesives do not permit movement of the jacket with respect to the inner insulating layer with time and under charging temperature and moisture conditions, unacceptable dimpling of the jacket often occurs with such adhesives.

One solution to the foregoing problems is to use soft, hot melt adhesives or two component urethane adhesives and to temporarily seal the flap to the outer surface of the insulation jacket at the-factory prior to shipping. This solution protects the surfaces to be adhered to one another to minimize any "fish mouthing" effects. This solution also wraps the jacket tightly about the inner insulating layer, and prevents separation of the structure during shipment because of the soft or uncured condition of the hot melt adhesive. This solution also avoids most dimpling effects. One existing structure that provides such a solution is found in U.S. Pat. No. 4,157,410. In this structure, tape is provided having either two or four layers of pressure sensitive adhesive separated by release liners. When applied to the insulation jacket and flap at the factory, the outer two release liners are removed, exposing a layer of pressure sensitive adhesive on either side of the structure which then temporarily bonds the flap to the outer surface of the insulation jacket. When it is desired to install the insulation segment at the job site, the flap is separated from the outer surface of the jacket by prying apart the structure along a central release liner in the structure that separates two adhesive layers. The central release liner is then removed, and the two adhesive layers are bonded together to permanently seal the flap to the outer surface of the insulation jacket.

Another solution is that disclosed in U.S. Pat. No. 5,104,701 assigned to the assignee of the present application. In the closure system of this '701 patent, a tape contains a layer of a low tack, pressure sensitive adhesive which bonds the tape on one side to a strip either on the outer surface of the jacket on one side of the slit or on the flap. The opposite side of the tape has a release liner to which a high tack adhesive layer on the other of the flap or the outer surface of the jacket is bonded to temporarily bond the flap to the outer surface of the jacket. The tape structure can be opened at the job site by peeling the adhesive layer on the tape away from the strip. Once the flap is opened, the release liner is removed and the high tack adhesive layer on the flap or jacket may be permanently bonded respectively to the outer surface of the jacket or the flap to provide a permanent seal.

Another structure is found in U.S. Pat. No. 5,964,252, in which an abridged release liner is provided to allow partial exposure of the adhesive layer to achieve a temporary bond.

This temporary bond may be severed and the release liner may be subsequently removed to achieve a permanent bond.

Another existing prior art structure in which an adhesive layer is disposed on one of the flap and the outer surface of the jacket is disclosed in U.S. Pat. No. 5,104,701. In one embodiment of this prior art structure, an adhesive tape is provided which can be bonded to the underside of the flap or to the outer surface of the jacket, either at the job site or at the factory. This tape typically includes a substrate having a layer of a pressure sensitive adhesive disposed on both sides thereof. The adhesive layer on one side of the substrate is bonded to the inside surface of the flap or to the jacket, while the adhesive layer on the other side of the substrate is covered by a release liner typically having a silicon coated surface. This tape is either cut or provided in strips which are adhered on the exposed adhesive side to the underside of the flap or to the outer surface of the jacket. At the job site, the insulation is wrapped about the pipe, the release liner is removed from the adhesive layer on the other side of the substrate, and the newly exposed adhesive layer then bonds the flap to the outer surface of the jacket of the insulation segment.

While the foregoing closure systems solve some of the problems associated with cylindrical pipe insulation, these closure systems are somewhat complicated, and therefore more expensive than desired.

SUMMARY OF INVENTION

This invention relates generally to an adhesive tape structure which may be used as a temporary closure and as a permanent closure for a flap for an insulation segment for a fluid conduit. The tape structure of this invention retains the insulation segment in a closed condition after manufacture and during shipment to prevent separation of the jacket and the inner insulating layer. Moreover, the temporary closure maintains the surfaces to be joined on the underside of the flap and the outer surface of the jacket in a clean and dry condition. The temporary seal is easily broken, and the permanent seal may be readily effected at the job site after wrapping the insulation segment about a pipe. The closure system of the present invention is simpler and therefore less complicated to use and less expensive to manufacture than some prior art closure systems.

In one aspect, this invention discloses an elongated tape structure which includes a substrate, a first layer of a pressure sensitive adhesive disposed on one surface of the substrate, a second layer of a pressure sensitive adhesive disposed on another surface of the substrate and a release liner which covers the second layer of pressure sensitive adhesive. The release liner is formed of first and second portions which are separated along a line extending in a direction of elongation of the tape structure. In one embodiment of this aspect, the first portion of the release liner is substantially wider than the second portion as measured in a direction transverse to the direction of elongation of the tape structure. In another embodiment, the second layer of pressure sensitive adhesive includes a gap having no adhesive which is aligned with and extends along the line separating the first and second portions of the release liner. In yet another embodiment, a tab is disposed on the first portion of the release liner for removal of the first portion of the release liner separately from the second portion. In another embodiment, there is a tab disposed on the second portion of the release liner for removal of the second portion of the release liner separately from the first portion.

In yet another embodiment, there is a tab disposed on the second portion of the release liner along an edge of the second portion facing the first portion of the release liner and overlying the gap. The tab is graspable for removal of the second portion of the release liner. In yet another embodiment of this aspect, there is a tab disposed on the first portion of the release liner along an edge of the first portion facing the second portion of the release liner and overlying the gap. This tab is also graspable for removal of the first portion of the release liner from the second layer of pressure sensitive adhesive.

In another aspect, a temporary closure between a flap and an outer surface of a jacket of an insulation segment is disclosed. The jacket includes a slit extending in the direction of elongation, and the flap is used to cover the slit. In this aspect, the temporary closure includes a substrate, a first layer of a pressure sensitive adhesive disposed on one side of the substrate and adhered to a selected one of the underside of the flap and an outer surface of the jacket, a second layer of a pressure sensitive adhesive disposed on another side of the substrate, and a release liner covering a first portion of the second layer of pressure sensitive adhesive to allow a second portion of the second layer of pressure sensitive adhesive to bond to the other of the underside of the flap and the outer surface of the jacket. In one embodiment of this aspect, the second portion of the second layer of pressure sensitive adhesive is positioned on a side of the slit in the insulation jacket facing a distal end of the flap. In another embodiment, the release liner is removable from the first portion of the second layer of pressure sensitive adhesive after breaking of a bond between the second portion of the second layer of pressure sensitive adhesive and the other of the underside of the flap and the outer surface of the insulation jacket, to allow the first portion of the second layer of pressure sensitive adhesive to be bonded to the other of the underside of the flap and the outer surface of the insulation jacket. In another embodiment, the closure is spaced from a distal end of the flap to provide an extension on the flap for grasping by a user to break the bond between the second portion of the second layer of pressure sensitive adhesive and the other of the underside of the flap and the outer surface of the insulation jacket.

In yet another embodiment of this aspect, the first layer of pressure sensitive adhesive is bonded to the underside of the flap, and the closure covers the slit in the insulation jacket. In this embodiment, the second portion of the second layer of pressure sensitive adhesive is adhered to the outer surface of the jacket on a side of the slit facing a distal end of the flap. In another embodiment, the first layer of pressure sensitive adhesive is bonded to the outer surface of the insulation jacket on a side of the slit facing the distal end of the flap, and the second portion of the second layer of pressure sensitive adhesive is bonded to the underside of the flap. In yet another embodiment, the second portion of the second layer of pressure sensitive adhesive is substantially narrower in width than the first portion in a direction transverse to the direction of elongation of the insulation segment.

In another aspect of the invention, a method for insulating a pipe is disclosed which uses an elongated cylindrical insulation segment having an outer jacket, a slit in the outer jacket extending in the direction of elongation of the segment to a central passageway for insertion of a pipe into the central passageway, and a flap for covering the slit in the outer jacket. This method includes providing a tape structure having a substrate, a first layer of a pressure sensitive adhesive disposed on one side of the substrate, a second layer of a pressure sensitive adhesive disposed on the other side of the substrate, and a release liner covering the second layer of pressure sensitive adhesive, bonding the tape structure along the first layer of pressure sensitive adhesive to a selected one of the underside of the flap and an outer surface of the insulation jacket, removing a narrow strip of the release liner to expose a narrow strip of adhesive on the second layer of pressure sensitive adhesive, and bonding the narrow strip of adhesive on the second layer of pressure sensitive adhesive to the other of the underside of the flap and the outer surface of the outer jacket to provide a temporary seal for shipment of the insulation segment to a job site. In one embodiment, the narrow strip of adhesive is bonded to the other of the underside of the flap and the outer surface of the insulation jacket on a side of slit facing a distal end of the flap. The method of this aspect may also further include breaking the temporary seal between the narrow strip of adhesive on the second layer of pressure sensitive adhesive and the other the underside of the flap and the outer surface of the outer jacket, inserting a pipe into the central passageway through the slit, removing the release liner from the second layer of pressure sensitive adhesive, and adhering the second layer of pressure sensitive adhesive to the other of the underside of the flap and the outer surface of the outer jacket.

In another embodiment, the removing step includes grasping the release liner by a tab and pulling the release liner from the second layer of pressure sensitive adhesive. In another embodiment, the step of bonding the tape may comprise adhering the first layer of pressure sensitive adhesive to the underside of the flap, and the step of bonding the narrow strip may comprise bonding the narrow strip of adhesive on the second layer of pressure sensitive adhesive to the outer surface of the outer jacket on a side of the slit facing a distal end of the flap.

In another embodiment of the method of this invention, a step of bonding the tape may comprise adhering the first layer of pressure sensitive adhesive to the outer surface of the outer jacket on a side of the slit facing the distal end of the flap, and the step of bonding the narrow strip of adhesive may comprise adhering the narrow strip of adhesive on the second layer of pressure sensitive adhesive to the underside of the flap. In yet another embodiment, the step of breaking the temporary seal comprises grasping an extension of the flap and pulling the flap away from the outer surface of the outer jacket. In yet another embodiment of the method of this invention, the release liner may be scored to separate the release liner into a narrow strip and a second strip substantially wider than the narrow strip in a direction transverse to the direction of elongation of the insulation segment. This scoring step may be performed after the step of bonding the tape and before the removing step. In yet another embodiment, the method may comprise providing a gap in the second layer of pressure sensitive adhesive. In another embodiment, the release liner is scored along a line aligned with the gap in the second layer of pressure sensitive adhesive to divide the release liner into two strips, the narrow strip and the second strip which is substantially wider than the narrow strip.

BRIEF DESCRIPTION OF THE DRAWINGS

The objects, advantages and features of this invention will be more clearly appreciated from the following detailed description, when taken in conjunction with the accompanying drawings, in which.

DETAILED DESCRIPTION

The present invention relates to a tape structure and/or a closure system that provides a temporary closure that may be transformed into a permanent closure. This structure or system has particular applicability to flaps on insulation segments, including insulation segments used in conjunction with pipes. It is to be understood, however, that this closure system may be used in other applications that require a temporary closure that can be transformed into a permanent closure. The closure system of this invention provided the advantages of prior art closure systems, including protection of the surfaces to be finally bonded prior to final closure so that the bond is dirt and moisture free, and, for cylindrical insulation segments, including holding the jacket and inner insulating layer together prior to curing of the adhesive to prevent their separation. The closure system of this invention includes a substrate with a pressure sensitive adhesive layer disposed on either side, and a release liner covering one of the pressure sensitive adhesive layers. The closure system is attached to the underside of the flap at the factory by the other, exposed adhesive layer. The release liner is scored such that a small strip of the release liner may be removed at the factory to expose a similarly narrow strip of pressure sensitive adhesive on the one adhesive layer. The narrow strip of adhesive is then secured directly to the outer surface of the jacket to temporarily attach the flap to the outer surface of the jacket. At the job site, the user can easily break the temporary seal provided by the narrow strip of pressure sensitive adhesive to permit removal of the remainder of the release liner. The now fully exposed one pressure sensitive adhesive layer can then be bonded directly to the outer surface of the jacket to provide a final and firm closure. Preferably, the layer of pressure sensitive adhesive covered by the release liner has a slight gap adjacent the score to facilitate easy scoring and/or removal of the release liner. It is understood, of course, that the narrow strip of adhesive could be bonded to the flap, and the other adhesive layer could be bonded permanently to the outer surface of the jacket adjacent the slit.

Figure 1:
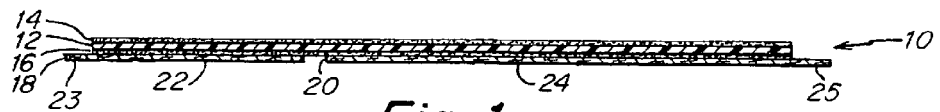
FIG. 1 is a partial, cross-sectional view of a tape structure illustrating one embodiment of the temporary closure system of this invention.

With reference now to the drawings, and more particularly to FIG. 1 thereof, one embodiment of the structure of the tape or closure system 10 of this invention will be described. Structure 10 includes at least one substrate 12, a first layer 14 of a pressure sensitive adhesive disposed on one side of substrate 12, another layer 16 of a pressure sensitive adhesive disposed on the other side of substrate 12 and a release liner 18 covering one of layers 14 and 16. Release liner 18 is provided with a score 20 extending along the length of structure 10 or into the page as shown in FIG.

1, or in the direction of elongation of structure 10. Score 20 divides release liner 18 into a narrow strip 22 and a wider strip 24. In the embodiment illustrated in FIG. 1, typically strip 24 of release liner 18 may extend beyond substrate 12 and layer 16 a short distance (i.e. to the right as shown in FIG. 1) to provide a tab 25 which may be grasped by the user for removal of strip 24. Similarly, strip 22 also may extend beyond layer 16 and substrate 12 on an opposite side of structure 10 (i.e. to the left as shown in FIG. 1) to provide a tab 23 for gripping by a user for removal of strip 22 independently of strip 24. In the embodiment shown in FIG. 1, there is no gap in the pressure sensitive adhesive layer 16 aligned with score 20.

Figure 2:
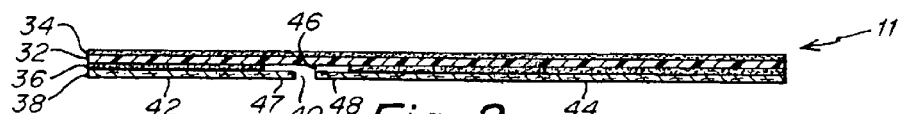
FIG. 2 is a partial, cross-sectional view of a tape structure illustrating another embodiment of the temporary closure system of this invention.

An alternative structure 11 is illustrated in FIG. 2. A substrate 32 is provided with a first layer 34 of a pressure sensitive adhesive disposed on one side, and a second layer 36 of a pressure sensitive adhesive disposed on the other side thereof. A release liner 38 covers one of layers 34 and 36. Release liner 38 includes a score 40 which divides release liner 38 into a wider strip 44 and a narrower strip 42. In FIG. 2, the adhesive layer 34 or 36 adjacent liner 38 includes a gap 46 in which there is no adhesive. Gap 46 is generally aligned with score 40. In this embodiment, gap 46 permits release liner 38 to be scored using a sharpened implement without engaging adhesive layer 34 or 36. When the sharpened implement pierces liner 38, it does not touch any adhesive which could slow down the scoring process, or gum up the sharpened implement, as the sharpened implement passes along gap 46. In addition, gap 46 may provide a slight tab 47 on strip 42 which can be grasped by a user for removal of strip 42, if needed. Similarly, there may be a tab 48 on strip 44 which is not adhered by adhesive layer 34 or 36 which can be grasped by the user for removal of strip 44. The provision of tabs 47 and 48 may render unnecessary overlapping of release liner 18 with respect to layer 16 and substrate 12 to provide tabs 23 and 25, as illustrated in FIG. 1, since strips 42 and 44 can be gripped along tabs 47 and 48. It is to be understood, however, that overlapping portions of strips 42 and 44 to provide tabs 23 and 25 could also be present in structure 11 in the manner illustrated in FIG. 1, in addition to tabs 47 and 48, or no tabs could be provided at all. In addition in other embodiments, only tab 48 may be provided, or both tabs 25 and 48 be present in the same structure, but not tabs 23 and 47.

Substrates 12 and 32 may be formed of any material typically used for a substrate for an adhesive, such as a low density or high density polyethylene, Nylon®, polyester, polyethylene, polypropylene or a metalized polyester or polyethylene.

Adhesive layers 14, 16, 34 and 36 may be formed of any suitable pressure sensitive adhesive that is commercially available and that is suitable for bonding to kraft paper or a metalized foil, such as metalized biaxially oriented polypropylene, or to any other materials that are typically used to form jackets on insulation segments. One example is a pressure sensitive acrylic adhesive such as that disclosed in U.S. Pat. No. 4,780,347, which is specifically incorporated herein by reference, and which is assigned to the assignee of the present application. This particular adhesive is a pressure sensitive, acrylic adhesive which, when cured, approaches a 100% acrylic compound in which substantially all solvents have been removed. This adhesive can, however, tolerate up to 1% solvents after curing and still perform as desired. When cured, these adhesive layers typically have a thickness of between about 1.0 and 5 mils and a coating weight of about 5.5 to about 27.5 pounds per 1,000 square feet. This particular acrylic adhesive is especially desirable, since it remains tacky and usable at temperatures as low as minus 17° Fahrenheit and as high as 284° Fahrenheit.

Release liners 18 and 38 can be any conventional release liner suitable for use with an acrylic adhesive. A typical release liner is a silicon coated, natural kraft paper release liner rated at about 70 pounds per ream.

Score 20 and score 40 may be formed utilizing any conventionally available cutting implement such as a knife, razor blade or other sharpened cutting blade such as that found on a high speed, coating line for manufacturing tape structures. With respect to the embodiment of FIG. 2, it is important that score 40 be aligned with gap 46. Therefore, preferably, score 40 is formed by a sharpened blade that is found on the used to form the tape structure and that can be controlled to be within the closely defined tolerances required by the narrow width of gap 46.

Where removal of strips 22 or 42 occurs during an automated process at the factory, no gripable tab 23 or 47 may be required for respective strips 22 or 42. In this instance, strips 22 and 42 are removed automatically by machinery which does generally not require a griping tab.

Figure 3:
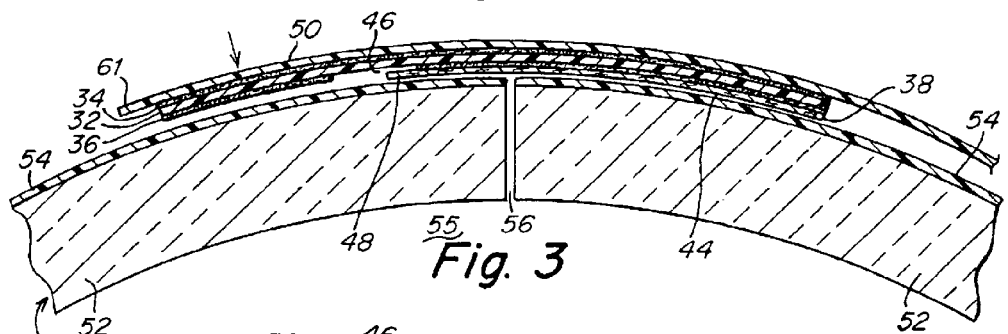
FIG. 3 is a partial, cross-sectional view illustrating application of the structure of FIG. 2 to an insulation segment to produce a temporary seal.
Figure 4:
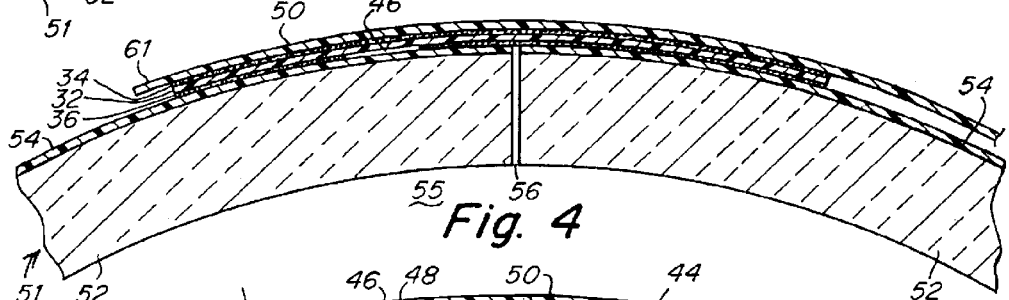
FIG. 4 is a partial, cross-sectional view illustrating a permanent seal on an insulation segment using the structure of FIG. 2.

An illustrative use of structures 10 and 11 in conjunction with a typical insulation segment will now be described with particular reference to FIGS. 3 and 4. While FIGS. 3 and 4 show only structure 11, it is understood, of course, that structure 10 can be used in the same manner as structure 11, and that the following description applies equally to structure 10.. Like numbers will be used for like parts, where appropriate. As described in the background section above, a cylindrical insulation segment 51 typically includes an inner insulating layer 52 surrounded by a jacket 54. A slit 56 extends through layer 52 and jacket 54 to allow opening of the segment 51 for insertion of a pipe in a central passageway 55. A flap 50, which is typically an extension of jacket 54, passes over the exterior of slit 56 for closure of slit 56 to seal a pipe (not shown) within insulation segment 51. Typically, jacket 54, as well as flap 50, is formed of a metalized, biaxially oriented polypropylene, although other layers of materials, such as kraft paper, polyester scrim, polyester or non-metalized polypropylene, could be employed in place of or in addition to the biaxially oriented polypropylene layer. The insulating layer 52 typically includes fiberglass or metal mineral wool, foamed cellular fiberglass or a rigid foam.

Initially, as shown in FIG. 3, structure 10 or 11 is mounted to the underside of flap 50 by pressure sensitive adhesive layer 14 or 34. Structure 10 or 11 typically is mounted to the underside of flap 50 at a point at which flap 50 overlies slit 56. Also, in one embodiment, as shown in FIG. 3, structure 10 or 11 is spaced inwardly from the distal end of flap 50 toward a proximal portion of flap 50 to form an extension 61 that may be gripped by a user to break a temporary seal, as will be described. The application of structure 10 or 11 to flap 50 typically is performed at the factory, although it need not be. Thereafter, strip 22 or 42 is removed and a resulting exposed thin strip of pressure sensitive adhesive layer 16 or 36 is bonded directly to the outer surface of jacket 54 adjacent slit 56 so that flap 50 covers slit 56. The exposed width of adhesive layer 16 or 36 that is bonded to the outer surface of jacket 54 is relatively narrow, so that this bond can be easily broken by the user at the job site. Thereafter, this insulation segment 51 is placed in a box for shipping.

At the job site, as illustrated in FIG. 4, the user breaks the bond between adhesive layer 16 or 36 and the outer surface of jacket 54, typically, by manually ripping flap 50 from jacket 54 by grabbing extension 61. Since flap 50 is only bonded to jacket 54 along an area about the width of strip 22 or 42, and since extension 61 of flap 50 extends beyond the area of flap 50 that is bonded jacket 54 extension 61 can be grabbed by the user to provide the leverage necessary to break the bond. Any damage done to flap 50 or to jacket 54 is minor and will be covered by flap 50 when slit 56 is permanently sealed. Once the bond has been broken, a pipe (not shown) is inserted through slit 56 until it resides in passageway 55. Thereafter, slit 56 is tightly closed about the pipe. The user then removes strip 24 or 44 by grabbing strip 24 or 44 by respective tab 25 or 48 and pulling strip 24 or 44 from respective layer 16 or 36. The user then affixes the exposed layer 16 or 36 of pressure sensitive adhesive directly to the outer surface of jacket 54 adjacent slit 56, as illustrated in FIG. 4, for a final and permanent bond to seal slit 56. Since this part of the outer surface of jacket 54 has been protected from contamination by flap 50 during storage, it is dry and free from dirt so that a secure and long lasting bond is provided.

It is to be understood that in the embodiment of FIGS. 3 and 4, while structure 10 or 11 is shown to be covering slit 56, structure 10 or 11 instead may be placed in a position on the outer surface of jacket 54 adjacent to but not covering slit 56, preferably adjacent to but spaced from a distal end of flap 50. Preferably, structure 10 or 11 is placed on a side of slit 56 facing the distal end of flap 50 and opposite The side facing a proximal portion of flap 50, where flap 50 is attached to or extends from jacket 54, so that flap 50 completely seals slit 56.

Figure 5:
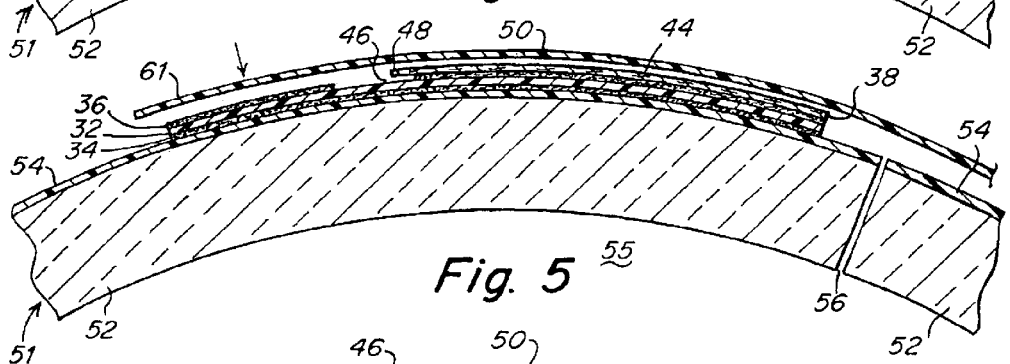
FIG. 5 is a partial, cross-sectional view illustrating an alternative embodiment of the application of the structure of FIG. 2 to an insulation segment to produce a temporary seal.
Figure 6:
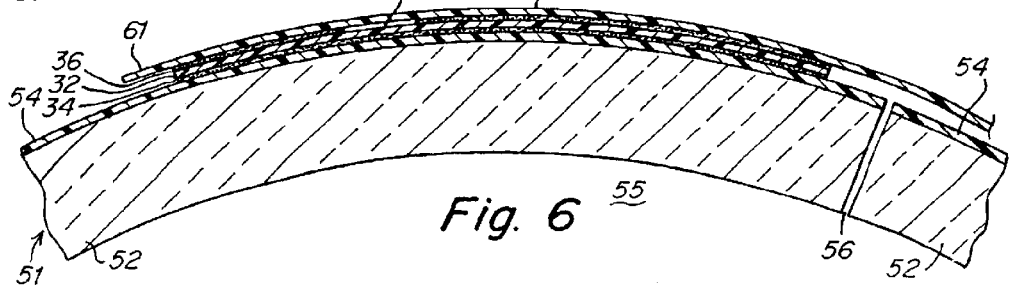
FIG. 6 is a partial, cross-sectional view illustrating an alternative embodiment of a permanent seal created on an insulation segment using the structure of FIG. 2.

An alternative embodiment of the application of the tape structure and/or closure system 10 or 11 of this invention to a cylindrical insulation segment will now be described with reference to FIGS. 5 and 6. Like numbers are used for like parts where appropriate. In this embodiment, in contrast to that of FIGS. 3 and 4, structure 10 or 11 initially may be applied to the outer surface of jacket 54, as opposed to the underside of flap 50. While FIGS. 5 and 6 specifically illustrate the use of structure 11 in conjunction with a cylindrical insulation segment, it is to be understood that the structure 10 of FIG. 1 could be used with an insulation segment in the same manner as, or in place of, structure 11, and that the following description applies to both structure 10 and structure 11. In the embodiment of FIG. 5, exposed pressure sensitive adhesive layer 14 or 34 is applied directly to the outer surface of jacket 54. In this embodiment, structure 10 or 11 is positioned adjacent slit 56 rather than covering slit 56 as shown in FIG. 3 to allow access to slit 56 by a pipe. Moreover, preferably, structure 10 or 11 is disposed on a side of slit 56 adjacent the distal end of flap 50, or on a side of slit 56 opposite the proximal portion where flap 50 is connected to or extends from jacket 54. In this manner, slit 56 is fully covered by flap 50 both for the temporary closure as illustrated in FIG. 5 and for the permanent closure as illustrated in FIG. 6. This positioning is preferred so that the flap fully covers and seals slit 56 for both the temporary closure and the permanent closure, and yet allows a user to open slit 56 to insert a pipe after breaking of the temporary seal.

As illustrated in FIG. 5, strip 22 or 42 has been removed from release liner 18 or 38, so that a narrow strip of pressure sensitive adhesive layer 16 or 36 is bonded to the underside of flap 50 to provide the temporary closure. Strip 24 or 44 of release liner 18 or 38 remains in place to prevent permanent closure. Preferably, extension 61 of flap 50 extends beyond structure 10 or 11 to allow flap 50 to be gripped to break the temporary seal at the job site.

FIG. 6 illustrates the permanent seal formed at the job site after the temporary seal illustrated in FIG. 5 has been broken. As previously described, the temporary seal of FIG. 5 is broken by gripping extension 61 and ripping flap 50 free of the outer surface of jacket 54. Thereafter, slit 56 is opened sufficiently to allow insertion of a pipe through slit 56 and into passageway 55, and then slit 56 is closed about the pipe. Strip 24 or 44 is removed such as by grasping respective tab 25 or 48 and pulling strip 24 or 44 free of adhesive layer 16 or 36. Flap 50 is then pulled tightly over slit 56 and pressed against exposed adhesive layer 16 or 36 until a tight bond is achieved, as illustrated in FIG. 6. This temporary closure of FIG. 5 and the resulting permanent closure of FIG. 6, provide a secure, tight seal.

Some examples of dimensions of various components of structures 10 and 11 will now be provided. It is understood, however, that these exemplary dimensions are being provided for purposes of illustration only, and are not intended to limit the scope of the invention. In a typical embodiment, the approximate width of strip 22 or 42 is about 1¼ inch, although wider or narrower strips could be used. For the embodiment of FIG. 2, gap 46 in adhesive layer 36 is approximately ⅜ of an inch, although wider or narrower gaps could be used. A typical size for tabs 47, 48, 23 and 25 is about ⅛ inch although wider or narrower tabs could be provided. Structures 10 and 11 typically are provided in tape form and a typical width is about 3 inches. However, wider or narrower tapes or structures could be used. In addition, structures 10 and 11 typically are provided on a roll. If structures 10 or 11 are provided on rolls, release liner 18 or 38 should be provided with a release coating on both sides, so that when the tape is wrapped in a roll, release liner 18 or 38 will release from respective pressure sensitive adhesive layer 14 or 34 to permit the tape to be unrolled for use. Alternatively, a separate release liner could be applied to pressure sensitive adhesive layers 14 and 34 to facilitate rolling or storage of the structure. In addition, if structures 10 and 11 are provided in flat sheets as opposed to rolls of tape, a release cover or coating must be applied to adhesive layers 14 and 34 to protect the layers 14 and 34 during storage.

Both structures 10 and 11 provide the desired protection to the surfaces to be bonded and prevent the jacket from separating from the insulation layer during shipping and storage. The final, permanent closure completely seals slit 56 to form a long lasting, permanent closure.

Modifications and improvements will occur within the scope of this invention to those of ordinary skill in the art. The above description is intended to be exemplary only, the scope of the invention being defined by the following claims and their equivalence.

What is claimed is:

1. A temporary closure between a flap and an outer surface of a jacket of an elongated insulation segment, the jacket having a slit extending in the direction of elongation and the flap being used to cover the slit, the closure comprising:
    a substrate;
    a first layer of a pressure sensitive adhesive disposed on one side of the substrate and being adhered to a selected one of an underside of the flap and an outer surface of the jacket;
    a second layer of a pressure sensitive adhesive disposed on another side of said substrate; and
    a release liner covering a first portion of said second layer of a pressure sensitive adhesive, a second portion of said second layer of pressure sensitive adhesive being bonded to the other of the underside of the flap and the outer surface of the jacket.

2. The temporary closure as recited in claim 1, wherein the second portion of said second layer of pressure sensitive adhesive is positioned on a side of the slit in the insulation jacket facing a distal end of the flap.

3. The temporary closure as recited in claim 1, wherein said release liner is removable from said first portion of said second layer of pressure sensitive adhesive after breaking of a bond between said second portion of said second layer of pressure sensitive adhesive and the other of the underside of the flap and the outer surface of the insulation jacket to allow said first portion of said second layer of pressure sensitive adhesive to be bonded to the other of the underside of the flap and the outer surface of the insulation jacket.

4. The temporary closure as recited in claim 1, wherein said closure is spaced from a distal end of the flap to provide an extension for grasping by a user to break the bond between said second portion of said second layer of pressure sensitive adhesive, and the other of the underside of the flap and the outer surface of the insulation jacket.

5. The temporary closure as recited in claim 1, wherein said first layer of pressure sensitive adhesive is bonded to the underside of the flap, wherein the closure covers the slit in the insulation jacket, and wherein said second portion of said second layer of pressure sensitive adhesive is adhered to the outer surface of the jacket on a side of the slit facing a distal end of the flap.

6. The temporary closure as recited in claim 1, wherein said first layer of pressure sensitive adhesive is bonded to the outer surface of the insulation jacket on a side of the slit facing the distal end of the flap, and wherein said second portion of said second layer of pressure sensitive adhesive is bonded to the underside of the flap.

7. The temporary closure as recited in claim 1, wherein said second portion of said second layer of pressure sensitive adhesive is substantially narrower in width than said first portion in a direction measured transverse to the direction of elongation of the insulation segment.

8. The temporary closure as recited in claim 1, wherein said first portion and said second portion of said second layer of pressure sensitive adhesive both extend substantially an entire length of the temporary closure in the direction of elongation of the insulation segment, and are disposed in a side-by-side relationship in a direction transverse to the direction of elongation of the insulation segment.

9. The temporary closure as recited in claim 8, wherein said release liner extends substantially the entire length of the temporary closure in the direction of elongation of the insulation segment.

10. The temporary closure as recited in claim 1, wherein said second layer of a pressure sensitive adhesive includes a gap in which there is no adhesive and which separates said second portion from said first portion of said second layer of pressure sensitive adhesive.

11. The temporary closure as recited in claim 10, wherein said gap extends in the direction of elongation of the insulation segment.

12. The temporary closure as recited in claim 10, wherein said release liner includes a tab portion that overlaps said gap to assist in grasping of said release liner.

13. The temporary closure as recited in claim 1, wherein said release liner is disposed over the slit in the jacket of the insulation segment.

14. The temporary closure as recited in claim 1, wherein said release liner includes a tab portion that extends beyond said first portion of said second layer of a pressure sensitive adhesive and that is unattached to either said first portion or said second portion of said second layer of a pressure sensitive adhesive to assist in grasping of said release liner.

\* \* \* \* \*